United States Patent [19]

Hazenbroek et al.

[11] Patent Number: 4,558,490

[45] Date of Patent: Dec. 17, 1985

[54] POULTRY CUT UP MACHINE

[76] Inventors: Jacobus E. Hazenbroek, Burg de Zeeuwstraat 52, Numansdorp, Netherlands; William L. Wallbridge, To Te Hill Sherfield, Romsey, Hants, England, 505 ojn

[21] Appl. No.: 529,153

[22] Filed: Sep. 2, 1983

[30] Foreign Application Priority Data

May 20, 1983 [NL] Netherlands .................... 8301800

[51] Int. Cl.⁴ ............................................ A22C 21/00
[52] U.S. Cl. ............................................ 17/52; 17/11
[58] Field of Search .................................... 17/11, 52

[56] References Cited

U.S. PATENT DOCUMENTS

| | | |
|---|---|---|
| 3,132,373 | 5/1964 | Altenpohl, Jr. ............ 17/44.1 |
| 3,531,825 | 10/1970 | Segur et al. . |
| 3,624,863 | 12/1971 | Gasbarro . |
| 3,946,461 | 3/1976 | Martin ....................... 17/11 |
| 3,950,820 | 4/1976 | Duncan et al. ............. 17/11 |
| 4,019,223 | 4/1977 | Baker . |
| 4,067,085 | 1/1978 | Gasbarro . |
| 4,251,901 | 2/1981 | Thomas et al. ............ 17/52 |
| 4,265,001 | 5/1981 | Hathorn et al. ............ 17/11 |
| 4,306,335 | 12/1981 | Hawk et al. ................ 17/52 |
| 4,385,419 | 5/1983 | Cantrell . |
| 4,385,421 | 5/1983 | Martin . |
| 4,406,037 | 9/1983 | Hazenbroek ............... 17/11 |

FOREIGN PATENT DOCUMENTS 180975 11/1966 U.S.S.R. .

OTHER PUBLICATIONS

Model 6182, Cut Up System–Barker International/U.S. Industries, Inc.
Auto-Cone Breast Deboning Systems, leaflet, Pritchard Sales Company.

Primary Examiner—Willie G. Abercrombie
Attorney, Agent, or Firm—Thomas & Kennedy

[57] ABSTRACT

A worker hangs birds on a series of movable modules M by placing the hocks of previously slaughtered and eviscerated birds in the pair of forks 30 affixed to the support plate 29 of each module. The thighs are received in the pair of tiltable forks 31. As the modules are conveyed about the machine a mandrel 28 carried by each module moves down into the cavity of the bird to stabilize the bird, and the bird is moved with the module through several cutting discs 1–7 which cut the carcasses into sections. The modules are rotated to orient the bird with respect to the cutting discs, and the legs of the bird are stretched by the tiltable forks 31 as the leg joint is cut.

12 Claims, 7 Drawing Figures

POULTRY CUT UP MACHINE

BACKGROUND OF THE INVENTION

This invention concerns an improved poultry cut up method apparatus, in which a previously slaughtered and eviscerated, oven-ready poultry carcass is cut in sections.

In the past, poultry carcasses have been removed from the overhead conveyor line in a processing plant and moved through various cutting equipment to separate the legs, thighs, and wings from the carcass, and to divide the main portion of the carcass into sections. For example, U.S. Pat. No. 3,943,600 describes a system for cutting apart poultry carcasses with the whole carcass entering a machine and the carcass being divided as it moves through the machine. Also, U.S. Pat. No. 3,624,863 describes a cut up machine in which poultry carcasses are mounted on mandrels and advanced through a series of cutting stations. U.S. Pat. Nos. 4,016,624, 3,930,282, 4,251,901, 4,306,335, and 4,385,421 describe other examples of how poultry carcasses can be cut apart.

While the prior art poultry cut up machines have been successful to a limited extent, the most popular cut up machines do not handle an entire carcass because the carcasses are not all the same in size and proportion and these variations tend to cause the machines for cutting the entire carcass to improperly cut the carcass. Rather, the most widely used cut up machines receive one half of a previously cut carcass, either the saddle or the breast. For example, U.S. Pat. No. 4,385,421 describes a cut up machine that receives the saddle of a bird and removes the legs at their thigh joints from the back of the carcass. Likewise, my copending U.S. application filed July 12, 1983 describes a halving machine which cuts through the carcass between the breast and the saddle and through the back bone to divide the carcass in half so that each half can be processed separately.

Although the separate handling of the saddles and breasts of poultry carcasses tends to enable more accurate division of the carcasses to be made, the separate processing requires more manual handling of the carcasses and more pieces of equipment in the processing plant.

SUMMARY OF THE INVENTION

Briefly described, the present invention comprises a poultry cut up machine which receives the whole dressed, oven-ready poultry carcass and accurately cuts the carcass into parts without manually handling the carcass at any stage of the cutting process. A sprocket wheel conveyor system is mounted on a support frame and moves a series of bird transport modules along a path adjacent a plurality of rotating cutting blades of at least a breast cutter and/or a wing cutter and/or a longitudinal cutter and/or a cross-bisection means and/or a drum-stick cutter. Each module includes a mandrel that is thrust into the previously eviscerated cavity to accurately position and to stabilize the bird. The conveyor system includes means to adjust the position of the mandrel and the bird as they move between the cutting stations, to put the mandrel and the bird in the correct position, to support the birds from inside their carcasses with respect to the rotating blades, and to put the birds under tension.

Each of said modules comprises a support plate spaced laterally from a mandrel with at least one pair of forks mounted on the support plate and straddling the mandrel for suspending a chicken by its legs upside-down. The module is arranged to rotate about a vertical axis as it is moved by the conveyor which presents the bird at different orientations to the cutters.

The mandrel functions as a stretching cone and stabilized the bird and causes the bird to be put under slight tension from inside. This is important especially with respect to the longitudinal cutter. The flesh and the bones of the birds will be loosened directly from one another, so that a fine straight cut is made.

On the support plate of each transport module a fixed pair of upper forks are provided in which the legs of a bird can be hooked, and therebelow a tiltable pair of supporting forks are provided, which, after the birds have passed the longitudinal cutter, put the legs of the bird under tension from the knee-joint up to the thigh as the leg joint is separated.

Each mandrel preferably has a recess to give passage to the blades of the breast cutter, and each stretching cone and each supporting plate has a slot to give passage to the blade of the longitudinal cutter.

Thus, it is an object of this invention to provide an automatic poultry cut up system in which whole, previously eviscerated, poultry carcasses can be cut apart into a multiple number of segments that are ready for delivery to the supermarket and to food serving establishments without requiring further cutting steps.

Another object of this invention is to provide an automatic poultry cut up machine which receives a whole dressed carcass and accurately and rapidly divides the carcass into pieces suitable for delivery to the market place.

Other objects, features and advantages of the invention will become apparent from reading the following specification, when taken in conjunction with the accompanying drawings.

BRIEF DESCRIPTION OF THE DRAWING

The invention will be further elucidated herebelow from the drawing, in which by way of example an embodiment of a machine according to the present invention is represented.

FIGS. 1 and 2 schematically illustrate the cuts which can be made on a bird, with the cut up machine represented in FIG. 3. In FIG. 3 the birds move from the right to the left on the visible side of the machine which is the side of the machine on which the birds are cut.

DETAILED DESCRIPTION

Figures 1, 2:
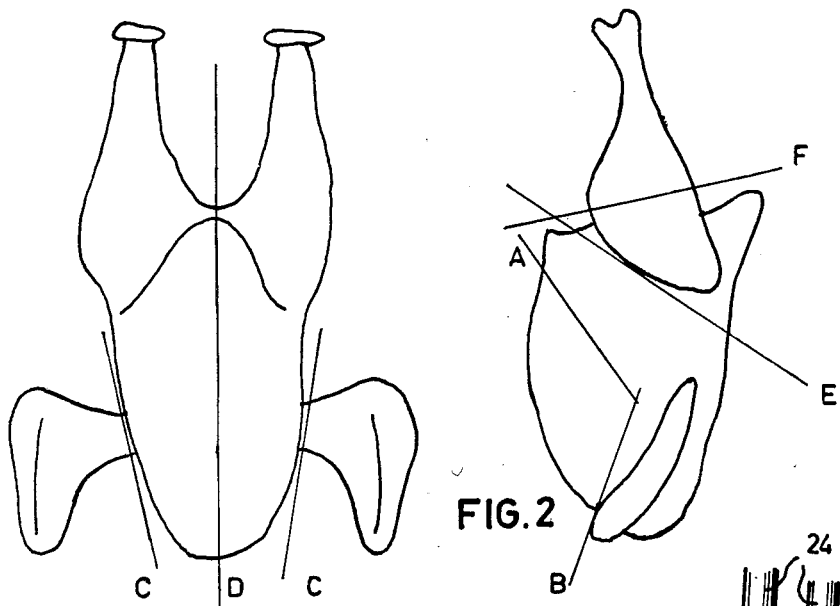
FIGS. 1 and 2 are schematic side elevational views of a bird, with cutting lines illustrating the cuts to be made by the cut up machine.

Referring now in more detail to the drawing, in which like numerals refer to like parts throughout the several views, the mounting of the birds to the machine takes place by hand on the non-visible side of the machine.

Figure 4:
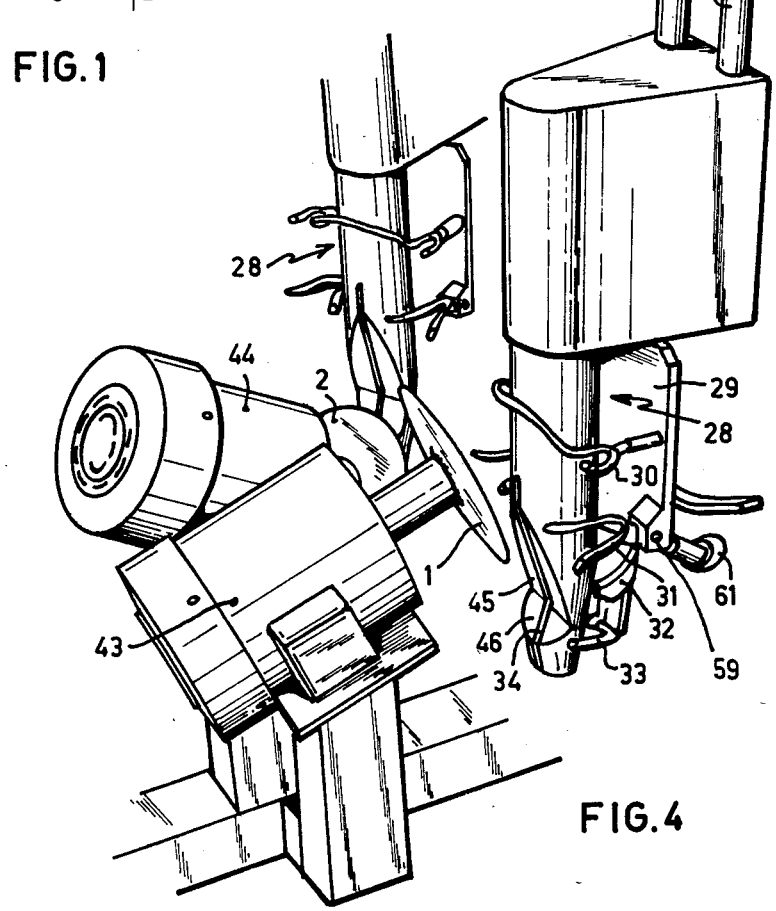
FIG. 4 is a detail illustration of the machine near the breast cutter.

Lines A and B of FIG. 2 indicate, with respect to the bird, the relative positions of the rotating blades 1 and 2 of the breast cutter illustrated in FIG. 4. Therefore, the breast pieces can be collected at B in FIG. 3.

Figure 5:
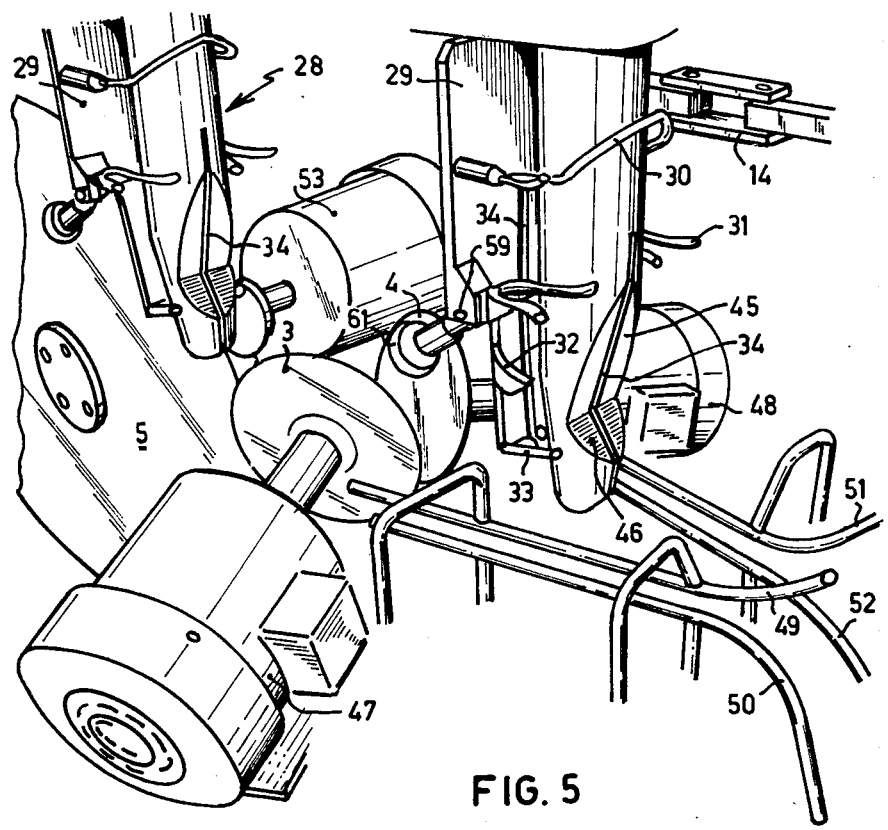
FIG. 5 is a detail illustration of the machine near the wing cutter and the longitudinal cutter.

Both of the lines C and the single line D of FIG. 1 indicate, with respect to the bird, the relative positions of the rotating blades 3, 4 and 5 of the wing cutter and longitudinal cutter both illustrated in FIG. 5. The wings can be collected at C in FIG. 3. Since FIG. 1 is the breast view of the bird it will be clear that the bird should be rotated 90° between positions B and C of FIG. 3.

Figure 6:
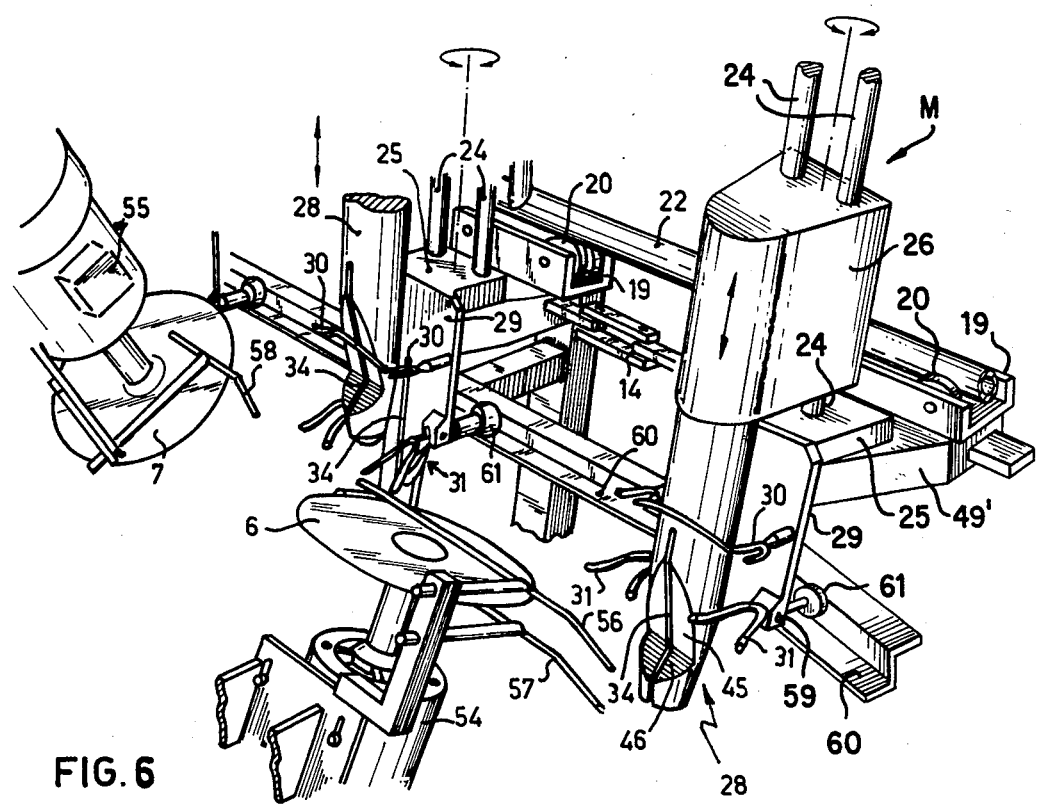
FIG. 6 is a detail illustration of the machine near the cross-bisection means and the drum-stick cutter.

Lines E and F of FIG. 1 indicate, with respect to the bird, the relative positions of the rotating blades 6 and 7 of the cross-bisection means and the drum-stick cutter both illustrated in FIG. 6. At E in FIG. 3 the backs can be collected and at F the thighs. In the machine only the so-called drum-sticks are left then. Since the cuttings E and F are shown in FIG. 2, it will be clear that the birds will be rotated back again 90° between positions D and E in FIG. 3.

Figure 3:
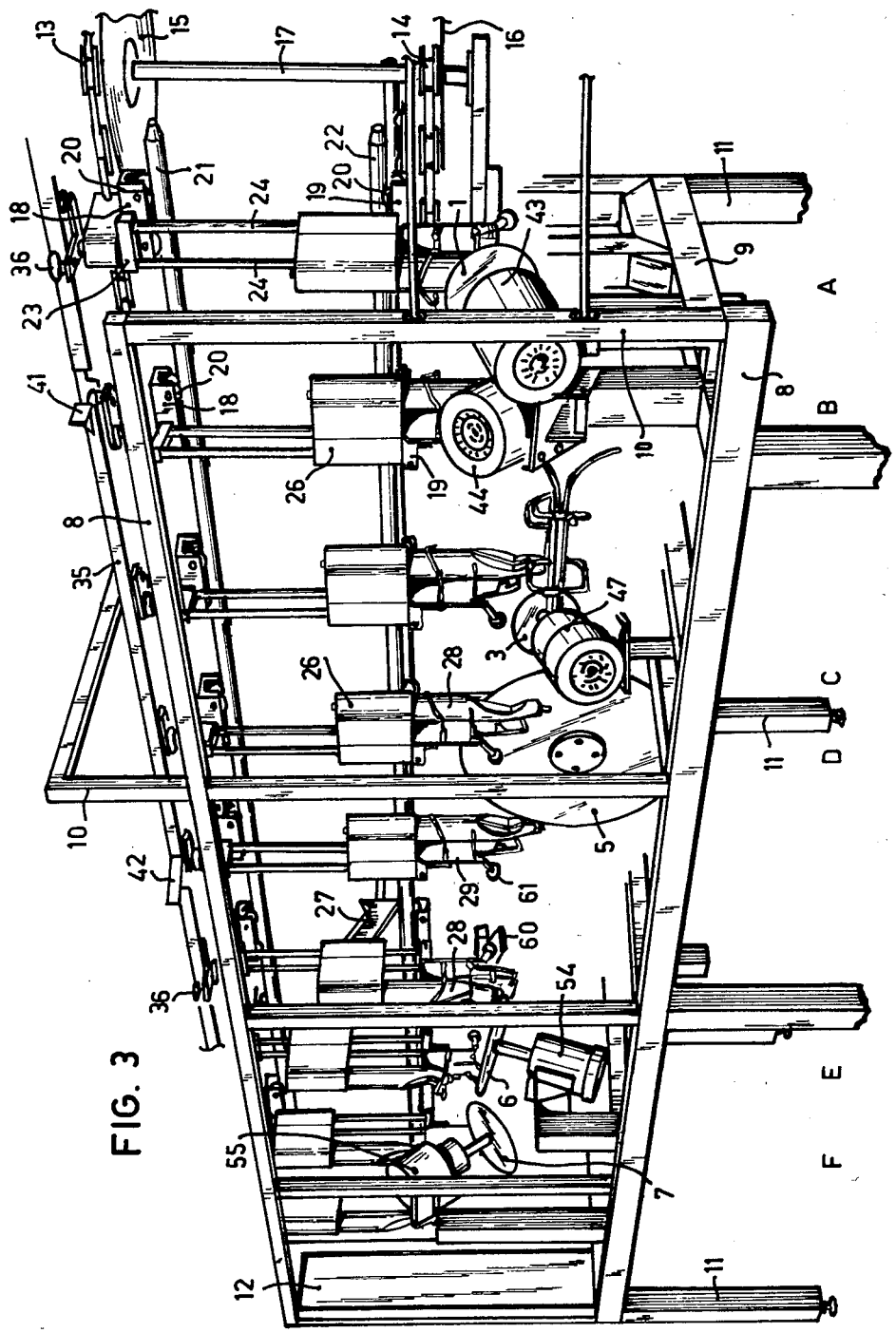
FIG. 3 is a perspective view of an embodiment of the cut up machine.

The cut up machine represented in FIG. 3 comprises a frame provided with longitudinal beams 8, crossbeams 9 and uprights 10. The represented frame has six legs 11, but of course it can be mounted in a elevated way with respect to the floor otherwise. A surface belt conveyor (not illustrated) usually is positioned beneath the lower longitudinal beams 8 to collect the segments of the birds dropped from the cut up machine. At least the side of the machine which is visible in FIG. 3 is completely covered by doors (not illustrated) during operation of the machine, and a security system (not shown) is provided which makes the rotating blades stop as soon as one of said doors is opened. In order to be able to illustrate the interior of the machine only one door 12 is provided on the remote end of the machine.

As illustrated in FIG. 3, a sprocket wheel system comprises an upper chain 13 and a lower chain 14. On the end of the machine which is nearby in FIG. 3, the chains 13 and 14 engage with chain wheels 15 and 16 supported on a vertical sprocket wheel shaft 17. The end of the machine which is remote in FIG. 3 has been carried out in an identical but not visible way. One of the sprocket wheel shafts is provided with a drive means for driving the sprocket wheel system.

A plurality of bird support modules M are positioned in series about the machine, and each module includes upper carriages 18 and 19 with upper carriage 18 connected to upper and lower chain 13 and lower carriage 19 connected to lower chain 14. The upper carriages 18 are provided with wheels 20 which protrude from the lower side of the carriage and which travel along the upper surface of guide rail 21 and lower carriages 19 (FIG. 6) are provided with wheels 20 which protrude from the upper side of the carriages and which travel along the lower surface of guide rail 22. At least at the places about the machine where the birds are cut the wheels 20 run over upper and lower guide rails 21 and 22, respectively. From FIG. 6 it appears that the guide rail 22 may be a tube having an annular cross-section; in that case the wheels are provided with two flanges.

Each of the upper carriages 18 carries a laterally extending support element 18' that supports an upper coupling member 23 which is rotatable about a vertical shaft 39 (FIG. 7), to which coupling member two vertical guide bars 24 are suspended. Each of the lower carriages 19 carries a laterally extending support element 19' that supports a lower coupling member 25 which is rotatable about a vertical shaft that is aligned with the vertical shaft 39. The lower ends of the guide bars 24 are, as shown in FIG. 6, connected to the lower coupling member 25.

A block 26 is slidably mounted along guide bars 24 of each module M. The blocks 26 normally are supported by the coupling members 25, by each block resting on the upper surface of its coupling member 25. Each block 26 is moved upwardly along guide bars 24 when a cam wheel (not illustrated) on the back of each block 26 engages cam track 27 (FIG. 3), so that each block 26 moves through a curved path starting between the longitudinal cutter D and the cross-bisection means E in FIG. 3. The downward movement of the blocks 26 is obtained on the not visible rear side of the machine by a downwardly sloped incline of cam track 27 before the end of the cycle of movement of the blocks about the machine.

On each block 26 a specially designed stretching cone or mandrel 28 is suspended which, during the passage of the birds through the breast cutters A and B, the wing cutters C and the longitudinal cutter D, is placed in its bird, which positions and stabilized the bird and keeps the bird slightly under tension from the inside.

By each lower coupling member 25 a supporting plate 29 (FIG. 6) is suspended, which is laterally spaced behind the mandrel 28. As illustrated in FIGS. 4–6, from said supporting plate 29 on both sides of the mandrel 28 extend a fixed pair of upper forks 30, a tiltable pair of supporting forks 31 positioned therebelow, a pair of bows 32 and a pair of arms 33. The members 30-33 provide together somewhat cup-like support from support plate 29, so that the bird is retained in the ideal position during the cutting operation.

The tiltable pair of supporting forks 31 are tilted by gravity to an up position when the birds are supplied to the side of the machine which is not visible in FIG. 3. After the birds have passed the longitudinal cutter D, the positioning by the mandrel 28 is no longer sufficient. The tiltable pair of supporting forks 31 are tilted "downwardly" then in a way which will be illustrated later on, in order to put the legs under tension from the knee-joint up to the thigh. This downward tilting of the forks 31 moves the forks out of the path of the drumstick cutter F.

From FIGS. 5 and 6 it appears that both the mandrel 28 and the support plate 29 have aligned slots 34. Said slots 34 serve to give passage to the large rotating blade 5 of the longitudinal cutter D through both the support plate and the mandrel.

Figure 7:
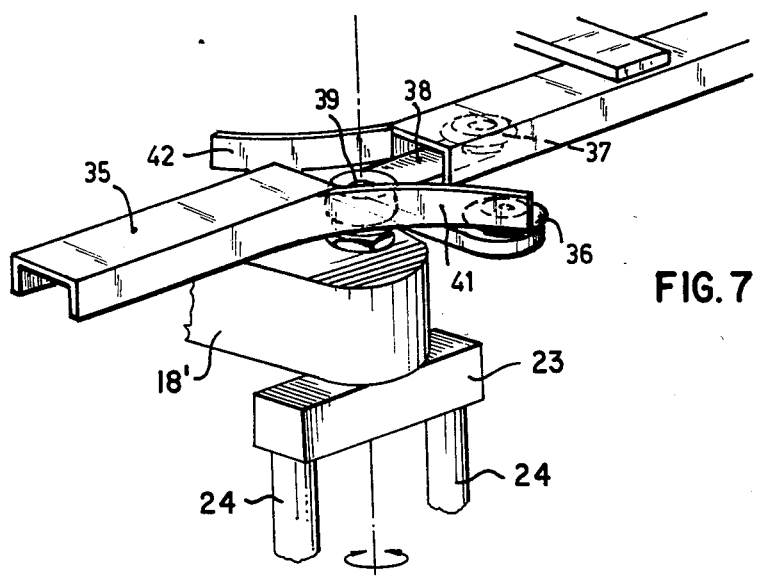
FIG. 7 is a detail illustration of the inverted channel with outwardly bent leg portions for positioning the modules.

In the total view of FIG. 3 finally reference should be made to an inverted channel 35 positioned above the upper chain 13, a special part of which is represented in FIG. 7. Said inverted channel 35 alternatingly houses the wheels 36 and 37 which are provided on the ends of a hooked horizontal lever 38 which is fastened to the vertical shaft 39 which on the other hand is fixedly connected to the upper coupling member 23 (FIG. 3) of each carriage 18.

On two places the side walls of the inverted channel are bent outwardly, viz., on the one hand between the breast cutters A and B and the wing cutter C, and on the other hand between the longitudinal cutter D and the cross-bisection means E. In FIG. 7 the first mentioned place is shown. The wheel 36 there runs against an outwardly bent side wall 41 of the inverted channel, whereby the vertical shaft 39 is rotated 90°. The wheel 37, which was in the channel, wants to turn to the outside now and is enabled thereto in that in the opposite side wall of the inverted channel 35 also a part 42 is bent outwardly. The wheel 37 assures in the secondly meant place that the vertical shaft 39 is rotated back again 90°.

FIG. 4 shows details of the breast cutters A and B. The rotating blades 1 and 2 are driven by electromotors 43 and 44 respectively but other drive means are within the scope of the invention. The mandrels or stretching cones 28 have a recess which is limited by a surface 45 parallel to the surface of the blade 1, and surface 46 parallel to the surface of the blade 2. In FIG. 4 it can be seen that the stretching cones after passing the breast cutters A and B begin to rotate 90°.

FIG. 5 shows details of the wing cutters C and the longitudinal cutter D. The rotating blades 3 and 4 of the wing cutters C are driven by electromotors 47 and 48, respectively. Before the chickens arrive at the rotating blades 3 and 4, the wings are lifted between left and right hand pairs of wing guide straps 49/50 and 51/52 respectively. The rotating blade 5 of the longitudinal cutter D is driven by an electromotor 53. Also here other drive means are within the scope of the invention.

FIG. 6 shows details of the cross-bisection means E and the drum-stick cutter F. The rotating blades 6 and 7 are driven by electromotors 54 and 55, respectively. In FIG. 6 it can be seen from the position of the slot 34 of the stretching cone 28, that it has been rotated back again over 90° with respect to the position of FIG. 5.

In front of the rotating blade 6 of the cross-bisection means E a pair of guide straps 56/57 is provided, and in front of the rotating blade 7 of the drum-stick cutter F another single guide strap 58. The supporting forks 31 are enabled to tilt about a shaft 59 which is connected to the supporting plate 29. The tilting is controlled by a rising curve 60 which pushes a roller 61, which is connected with the forks behind the supporting plate 29, upwardly whereby the supporting forks will tilt "downward" and put the chicken legs under tension from the knee-joint up to the thigh. The backward or "upward" tilting and remaining in said position of the supporting forks 31 occurs under influence of gravitation. Therefore the mass behind shaft 59 is larger than in front of shaft 59.

After all above-mentioned operations have been carried out on the chicken, only the drum-sticks, which are suspended in the fixed pair of upper forks 30, are left. Said drum-sticks can be removed in a simple (not indicated) way.

It should be understood that embodiments other than that shown in the drawing are within the scope of the invention as set forth in the following claims.

We claim:

1. In a machine for cutting slaughtered poultry carcasses into pieces including a plurality of carcass support modules and conveyor means for moving said modules in spaced series along a processing path, the improvement comprising each module including a support means for suspending a carcass by its legs in an inverted attitude, a mandrel located in laterally spaced relationship with respect to said support means and movable vertically with respect to said support means downwardly to enter the visceral cavity of the carcass supported by said support means to distend the carcass cutting means positioned along said processing path for cutting the bird moved by the support means and mandrel along the processing path, and means for rotating said mandrel and support means about common vertical axis in the processing path to present the carcass at different attitudes to said cutting means.

2. The improvement of claim 1 and wherein said conveyor means includes means for raising and lowering the mandrel of each module in response to the movement of the module along the processing path.

3. The improvement of claim 1 and wherein the mandrel defines a slot and the support means of each module defines a slot, and with the mandrel slot and the support means slot of each module being aligned with each other, whereby the slots of the support means and mandrel can pass about a cutting member as the support member and mandrel are moved by said conveyor means and the carcass is cut by the cutting member.

4. A method of cutting apart poultry carcasses comprising:
supporting a previously eviscerated carcass from its legs in an inverted attitude;
moving the carcass while it is supported from its legs along a processing path,
as the carcass moves along the processing path inserting a mandrel downwardly into the visceral cavity of the carcass to distend the carcass, and while the mandrel is in the cavity cutting the carcass with first rotary cutting discs oriented substantially parallel to the processing path, and then rotating the mandrel and the carcass together about a vertical axis approximately 90 degrees with respect to the direction of movement of the carcass along the processing path and cutting other parts of the carcass with second rotary cutting discs oriented substantially parallel to the processing path.

5. The method of claim 4 and wherein the step of cutting the carcass with said first rotary cutting discs comprises cutting the breast from the remaining portions of the carcass, and wherein the step of cutting the carcass with said second rotary cutting discs comprises cutting the carcass in half.

6. In a machine for cutting previously eviscerated poultry carcasses into pieces, a plurality of carcass support modules, a conveyor system for moving said modules in series along a poultry processing path, each of said modules comprising a support plate, hock support means mounted in spaced relationship with respect to each other to said support plate for receiving the hocks of a carcass in spaced relationship and supporting a carcass adjacent said support plate in a inverted attitude with its visceral opening oriented upwardly, a mandrel positioned adjacent said support plate, means for reciprocating said mandrel adjacent said support plate to enter the previously eviscerated cavity of a poultry carcass suspended by said hock support means, said mandrel and said support plate of each module defining aligned openings, means for rotating said mandrel and said support plate of each module about a common axis as the module moves along the processing path to selectively orient the aligned openings of the mandrel and support plate along and away from the direction of movement of the processing path, a plurality of carcass cutting means positioned along said processing path including a carcass cutting member aligned with the aligned openings of the mandrel and support plate when oriented along the direction of movement of the processing path, whereby when carcasses are hung by their hocks at the carcass support modules and the carcass support modules are moved by the conveyor system the mandrels move into the previously eviscerated cavity of the carcasses to fill the cavities and distend the carcasses, the carcasses are turned with the mandrels and support plates to orient the aligned openings of the mandrels and support plates away from the direction of movement of the processing path and the carcasses are cut as they pass the cutting means, and the carcasses are turned with the mandrels and support plates to orient the aligned openings of the mandrels and support plates along the direction of movement of the processing path and the carcasses and the openings of the mandrels and support plates are passed about the cutting means to cut the carcasses in halves.

7. The machine of claim 6 and wherein said mandrels include a recess defined by intersecting flat surfaces, and wherein said plurality of carcass cutting means comprises a first cutting means to cut into a carcass adjacent one flat surface of said mandrel and a second cutting means to cut into a carcass adjacent the other flat surface as the mandrel moves along the poultry processing path.

8. A method of cutting previously eviscerated poultry carcasses into pieces comprising:

hanging the carcasses in an inverted attitude by their legs in spaced series with the opening of the previously eviscerated visceral cavity of each carcass facing upwardly, continuously moving the carcasses in series along a processing path while hanging by their legs, moving a mandrel downwardly into the previously eviscerated cavity of each carcass to distend the carcass about its cavity, and as the carcasses are distended and continuously move along the processing path: rotating the carcasses and the mandrels between one position where the carcass breasts face to one side of the direction of movement of the carcass and another position where the carcass breasts face along the direction of movement of the carcass to present the carcasses in different attitudes to different cutting means positioned at intervals in the processing path, and cutting appendages from the carcasses and cutting through the carcasses with the cutting means.

9. The method of claim 8 and wherein the step of cutting appendages from the carcasses and cutting through the carcasses comprises cutting across the breasts of the carcasses when the breasts of the carcasses face to one side of the direction of movement of the carcasses, and cutting longitudinally through the backbone of the carcasses when the breasts of the carcasses face along the direction of movement of the carcasses to divide the carcasses in halves.

10. The method of claim 8 and wherein the step of cutting appendages from the carcasses and cutting through the carcass comprises cutting the wings away from the carcasses when the breasts of the carcasses face along the direction of movement of the carcasses, and cutting the legs away from the carcasses when the breasts of the carcasses face to one side of the direction of movement of the carcasses.

11. The method of claim 8 and wherein the step of rotating the carcasses and the mandrels and cutting appendages from the carcasses and cutting through the carcasses comprises cutting across the breasts of the carcasses as the breasts of the carcasses face to one side of the direction of movement of the carcasses, rotating the carcasses and the mandrels to a position where the carcass breasts face along the direction of movement of the carcasses and cutting the wings from the carcasses and cutting along the back bone of the carcasses to divide the carcasses, rotating the carcasses and the mandrels to a position where the carcass breasts face to one side of the direction of movement of the carcasses and cutting the legs from the carcasses.

12. Apparatus for cutting apart previously eviscerated poultry carcasses comprising a plurality of carcass support modules, conveyor means for continuously moving the modules in spaced series along a processing path, each of said carcass support modules including a pair of leg support forks for engaging the legs of a carcass to hold the carcass in a legs-up attitude with the opening of the previously eviscerated visceral cavity facing upwardly, and a mandrel above the anticipated position of the opening of the cavity, means for moving the mandrel downwardly to enter the cavity of the carcass held at the support module and to distend the carcass, a plurality of cutting means positioned in the processing path for cutting the carcasses, and means for rotating the carcass support modules in the processing path as the carcasses and support modules move along the processing path to present the carcass at different attitudes to said cutting means.

* * * * *